(12) United States Patent
Marques

(10) Patent No.: US 10,453,349 B2
(45) Date of Patent: Oct. 22, 2019

(54) LANDING DISTANCE MONITOR

(71) Applicant: Embraer S.A., São José dos Campos-SP (BR)

(72) Inventor: Caio Cramer Almeida Marques, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 15/056,747

(22) Filed: Feb. 29, 2016

(65) Prior Publication Data

US 2017/0249851 A1 Aug. 31, 2017

(51) Int. Cl.
*G08G 5/02* (2006.01)
*G08G 5/00* (2006.01)
*G01C 23/00* (2006.01)

(52) U.S. Cl.
CPC ........... *G08G 5/025* (2013.01); *G01C 23/00* (2013.01); *G08G 5/0021* (2013.01)

(58) Field of Classification Search
CPC ....... G08G 5/025; G08G 5/02; G08G 5/0021; G08G 5/0017; G08G 5/003
See application file for complete search history.

(56) References Cited

U.S. PATENT DOCUMENTS

| | | | |
|---|---|---|---|
| 9,245,450 B1* | 1/2016 | Chiew | G05D 1/0676 |
| 2013/0261855 A1* | 10/2013 | DeGagne | G08G 5/0021 |
| | | | 701/16 |
| 2017/0158349 A1* | 6/2017 | Scacchi | B64D 43/00 |

OTHER PUBLICATIONS

Axenty, Dave, "Rules of Thumb", Jan. 25, 2011, Axenty Aviation, http://axenty.com/blog/tips/rules-of-thumb/.*

* cited by examiner

*Primary Examiner* — Spencer D Patton
(74) *Attorney, Agent, or Firm* — Nixon & Vanderhye P.C.

(57) ABSTRACT

A system for warning a flight crew of potential runway overruns during landing comprises a computer processor implementing at least one neural network comprising plural inputs and at least one output. The inputs comprise at least one or more of the following: pressure altitude, air temperature, wind speed, weight, calibrated airspeed, autobrake setting, runway slope, and runway condition. The system uses the neural network to continually calculate at least the remaining distance on the runway and to generate an alert when the remaining distance is insufficient.

20 Claims, 4 Drawing Sheets

Final approach and landing schematic view, containing variables names and definitions.

Basic system architecture: represents the diagram of a system developed as described in this document, flowing the information up to flight crew and recorders.

Final approach and landing schematic view, containing variables names and definitions.

Neural network schematic architecture

Landing Distance Monitor calculation procedure

… … …

LANDING DISTANCE MONITOR

CROSS-REFERENCE TO RELATED APPLICATIONS

None.

STATEMENT REGARDING FEDERALLY SPONSORED RESEARCH OR DEVELOPMENT

None.

FIELD

The present application relates to a method and a device to improving flight crew situational awareness during an aircraft final approach and landing, through landing distance dynamic calculation, and more particularly to the use of neural networks in such contexts.

BACKGROUND

Statistically, in the decade between 2004 and 2013, the third most common fatal aircraft accident type was due to runway overrun during landing (Statistical Summary of Commercial Jet Airplane Accidents—Worldwide Operations 1959—2013, Aviation Safety—Boeing Commercial Airplanes, Seattle—Wash.—US 2014). Minimizing or avoiding such accidents is an important goal.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

The reasons for the occurrence of runway overruns during landing can be better understood by making a closer analysis about landing maneuvers. This flight phase requires a high level of pilot attention, as many factors can contribute to an overrun event. As part of the performed tasks one can enumerate monitoring the glide slope, aircraft speed, aircraft configuration, atmosphere and runway conditions, and touch down point, among others. Additionally, some landings are made based on information obtained in a calculation which the inputs are the best information known at the moment when the aircraft took off.

A known procedure to reduce the possibility of the occurrence of overruns is to continuously recalculate the landing distance before landing the aircraft, in order to account for operational deviations at required landing distance. Some deviations are common contributing factors in landing overrun statistics, e.g., wind speed increase, aircraft overspeed, long flare, and delay on brakes application, among others. However, manual continuous calculation is generally not practicable, and the goal of increasing situational awareness had not been achievable.

A solution is to automate the calculation and advise pilots when required landing distance is greater than the landing distance available. By doing this, the flight crew is alerted only when deviations can result in an undesirable condition. Some systems exist to perform this function but they generally have either high acquisition costs or low precision due to the calculation method applied The non-limiting method and device presented herein minimizes the risks of a landing overrun and increases flight crew situational awareness. To accomplish these goals, the system actuates in the final approach and landing phases returning automatic alerts to the flight crew when necessary.

Figure 1:
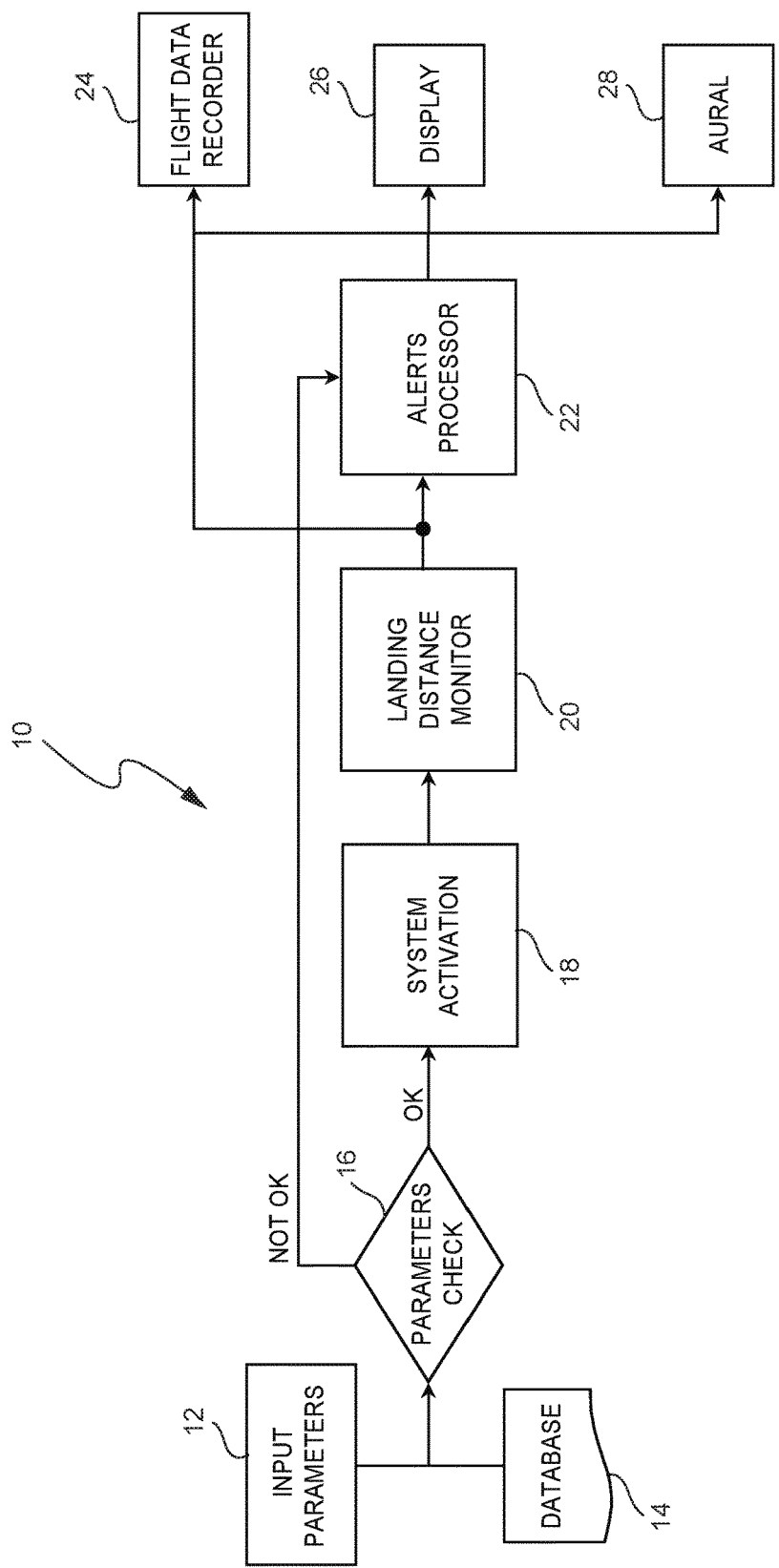
FIG. 1 shows a basic non-limiting system architecture, which represents the diagram of a system flowing the information up to flight crew and recorders.

FIG. 1 shows an example non-limiting embodiment of a system 10 providing a basic system architecture that flows information from left to right up to a flight crew and recorders. In this example system 10, input parameters 12 and a database 14 are provided to a parameters check 16. If the parameters check 16 indicates that the parameters are okay, the system is activated (block 18) and the system begins monitoring landing distance (block 20). The output of the landing distance monitor 20 is processed by block 22 and is provided to a flight data recorder 24, a display 26 and an aural indicator 28. Meanwhile, if the parameters check 16 indicates that the parameters are not okay (other exit to decision block 16), a signal is provided to alerts processor 22 to provide a visual and aural warning to the flight crew via the display 26 and aural indicator 28. In one example embodiment, the blocks 16, 18, 20, 22 are performed by one or more computer processors executing software instructions stored in non-transitory memory.

Figure 2:
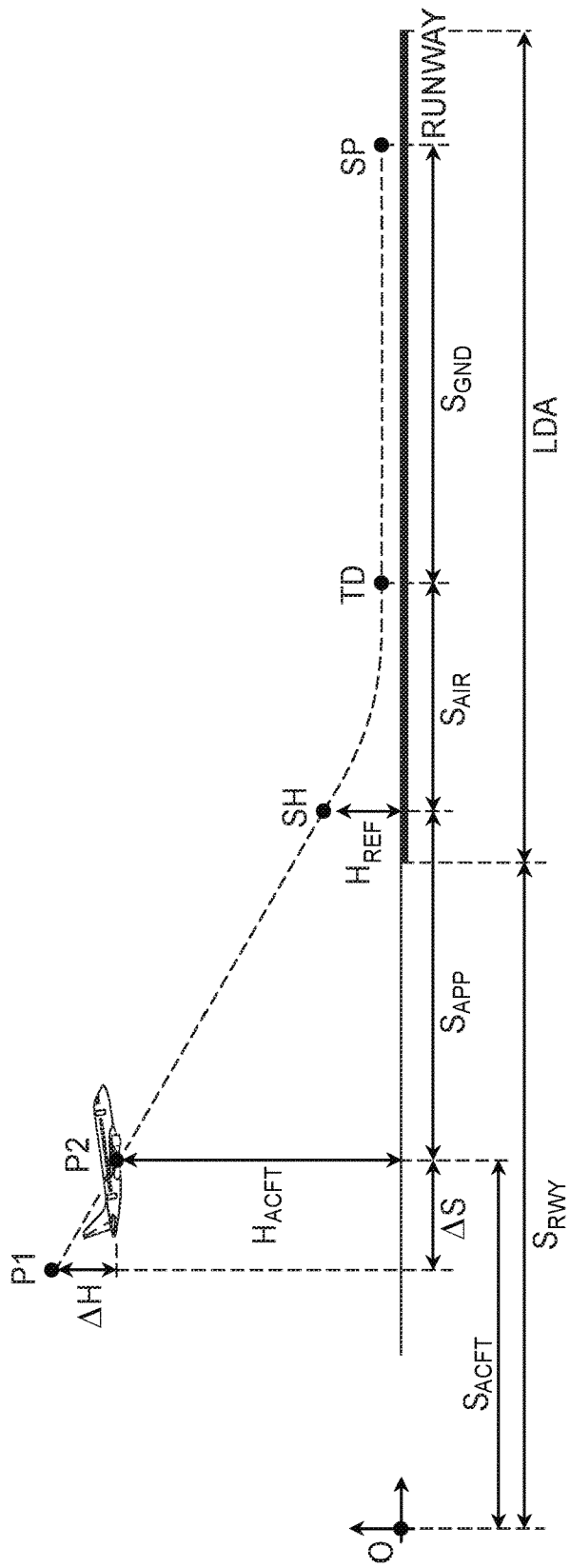
FIG. 2 shows an example final approach and landing schematic view, containing variables names and definitions.

The final approach starts when aircraft is in air and configured to land, and ends where landing begins. In the example non-limiting embodiment, the beginning of the landing maneuver is defined by a reference height, called $H_{REF}$. See FIG. 2. Horizontal distances $S_{ACFT}$, $S_{RWY}$ and $\Delta S$ are obtained through GPS coordinates distance calculations, using the equation below.

$$a = \sin^2((LAT2-LAT1)/2) + \cos(LAT1) \cdot \cos(LAT2) \cdot \sin^2((LNG2-LNG1)/2)$$

$$D = 2R \times \tan^{-1}(\sqrt{a})$$

where
D=distance between two known locations,
R=earth radius,
LAT1, LNG1=coordinates from the first location, and
LAT2, LNG2=coordinates from the second location.

For a given aircraft position P2, knowing a previous position P1, the system calculates the horizontal distance up to SH–$S_{APP}$, as below.

$$S_{APP} = \frac{\Delta S}{\Delta H} \times (H_{ACFT} - H_{REF}) = \frac{(H_{ACFT} - H_{REF})}{\tan(FPA)}$$

where
$H_{ACFT}$=aircraft height above ground level (zero, if on ground),
$H_{REF}$=height above ground level where landing begins,
$\Delta H$=height difference between P1 and P2,
$\Delta S$=horizontal distance between P1 and P2, and
FPA=flight path angle.

Figure 3:
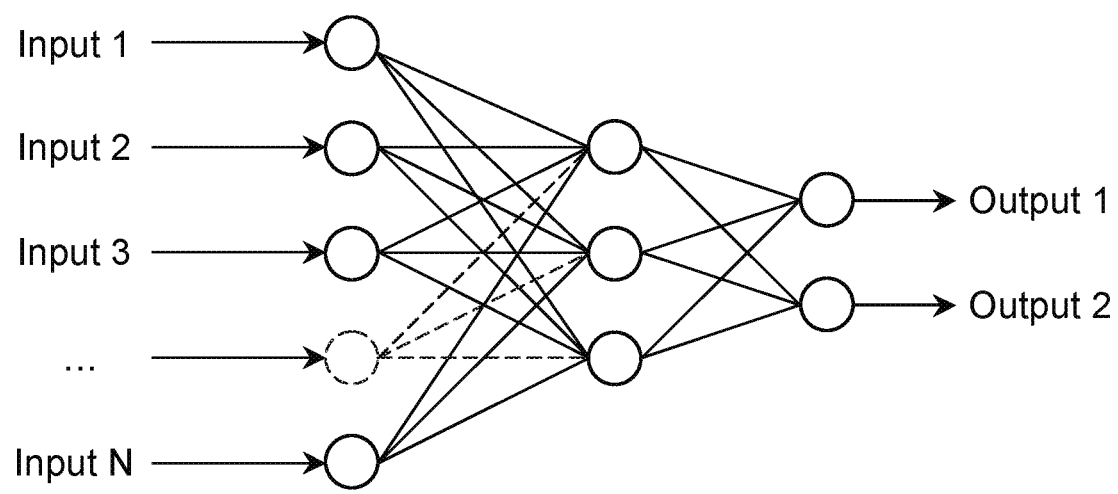
FIG. 3 shows an example non-limiting neural network schematic architecture.

In order to calculate distances $S_{AIR}$ and $S_{GND}$ during final approach (from higher heights—for example, 1000 ft—up to SH height), one example non-limiting embodiment of system 10 uses a neural network with a said number of inputs and a said number of outputs, based on the performance data for a given airplane (see FIG. 3). The number of neurons can vary depending on which airplane the neural network is prepared for. A non-limiting example of inputs and outputs is demonstrated in the table below, as the neural network example in FIG. 3:

| INPUTS | | OUTPUTS |
|---|---|---|
| Pressure altitude | Autobrake setting | $S_{AIR}$ |
| Air temperature | Runway Slope | $S_{AIR} + S_{GND}$ |
| Wind speed | Runway condition | |
| Weight | | |
| Calibrated airspeed | | |

During the landing phase (between SH and SP), the remaining air distance is calculated using the equation below.

$$S_{AIR} = \frac{H_{ACFT}}{H_{REF}} \times S_{AIR,HREF}$$

where $S_{AIR,HREF} = S_{AIR}$ calculated by the neural network at SH position.

During the air landing phase (between SH and TD), the remaining ground distance is calculated as below:

$$S_{GND} = S_{GND,HREF}$$

where $S_{GND,HREF} = S_{GND}$ calculated by neural network at SH position.

During the ground landing phase (between TD and SP), two methods can be used to calculate the remaining ground distance. The first one is given by the equation below.

$$S_{GND} = a \cdot GS^2 + \frac{(S_{GND,HREF} - a \cdot GS_{TD}^2)}{GS_{TD}} \cdot GS$$

where
$GS_{TD}$=ground speed at the touchdown moment,
GS=ground speed in the moment of calculation, and
a=curvature coefficient.

The second method is to obtain a neural network exclusively for remaining ground distance. A non-limiting example of inputs and outputs is demonstrated in the table below.

| INPUTS | | OUTPUTS |
|---|---|---|
| Pressure altitude | Ground Speed | $S_{GND}$ |
| Air temperature | Autobrake setting | |
| Wind speed | Runway Slope | |
| Weight | Runway condition | |

The position where landing initiates—SH, is calculated by $$SH = S_{ACFT} + S_{APP} - S_{RWY}$$

The position where the aircraft will touch the runway—TD, is defined by:

$$TD = S_{ACFT} + S_{APP} + S_{AIR} - S_{RWY}$$

The position where the aircraft will stop—SP, is defined by:

$$SP = S_{ACFT} + S_{APP} + S_{AIR} + S_{GND} - S_{RWY}$$

The flight crew is alerted when SP trending indicates the stop position will pass LDA (Landing Distance Available) end in $t_{REACT}$ seconds. The parameter $t_{REACT}$ is a manufacturer choice and may be any number, as zero or one, for example.

Furthermore, the example non-limiting system allows the flight crew to shorten the LDA length for the operator to increase the safety margin (as its option) or accounts for threshold displacement and LDA reduction.

Moreover, the non-limiting system is prepared to alert the pilot when air landing distance is greater than expected. Timing from the moment in which aircraft fly over SH position, if spent time is higher than $t_{LF}$ seconds (7 s, for example) and aircraft didn't touch the runway yet, the device provides a "long flare" alert.

Figure 4:
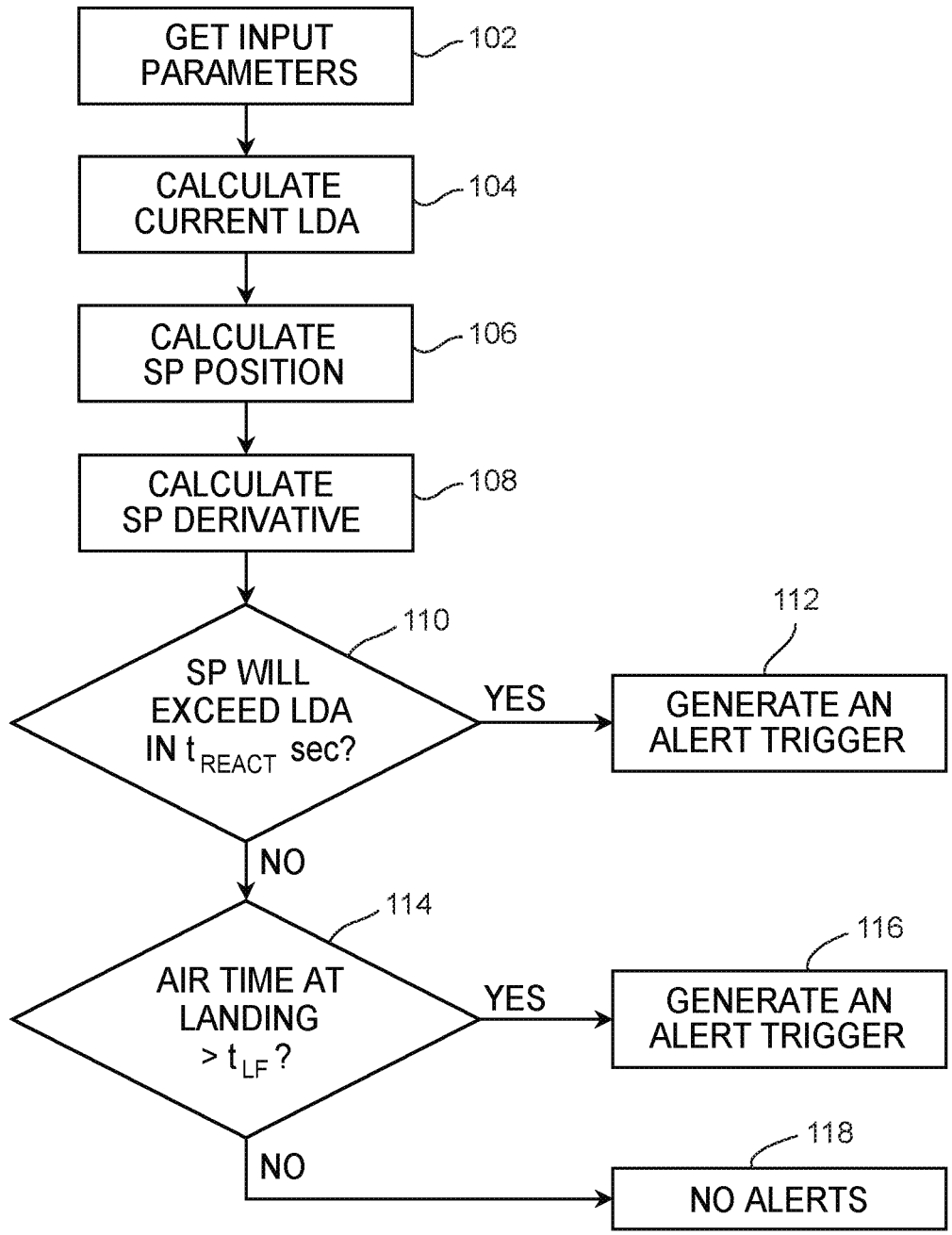
FIG. 4 shows an example non-limiting Landing Distance Monitor calculation procedure.

An example non-limiting procedure for Landing Distance Monitor 20 calculations can be seen on FIG. 4. In this non-limiting embodiment, the processor gets input parameters (102) and calculates the current LDA (104). The processor calculates SP position (106) and its derivative (108). The processor then detects whether SP will exceed LDA in $t_{react}$ seconds. If SP will exceed LDA within the time period, the processor will generate an alert trigger (112). Otherwise, the processor tests whether the air time at landing will be greater than $t_{LF}$ (114). If the air time at landing will exceed this value, the processor generates an alert trigger (116). Otherwise, no alerts are generated (118).

Variable Names and Definitions a: curvature coefficient
FPA: flight path angle
$G_{STD}$: ground speed at the touchdown moment
GS: ground speed in the moment of calculation
$H_{ACFT}$: aircraft height above ground level (zero, if on ground)
$H_{REF}$: reference height above ground level where landing begins
ΔH: height difference between P1 and P2
LDA: Landing Distance Available
$S_{APP}$: horizontal distance between P2 and SH
$S_{ACFT}$: horizontal distance from origin O to P2
$S_{AIR}$: horizontal distance between SH position and TD position
$S_{AIR,HREF}$: $S_{AIR}$ calculated by the neural network at SH position
$S_{GND}$: horizontal distance between TD position and SP position
$S_{GND,HREF}$: $S_{GND}$ calculated by neural network at SH position
SH: Position at $H_{REF}$; position where landing initiates
SP: Position where the aircraft will stop; end of ground landing phase
$S_{RWY}$: horizontal distance from origin O to runway
ΔS: horizontal distance between P1 and P2
TD: position where the aircraft will touch the runway
$t_{REACT}$: any number, as zero or one, for example, seconds While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system for warning a flight crew of potential longitudinal runway overruns while an aircraft is in air or on the ground during landing, comprising:
   at least one sensor that senses position of the aircraft; and
   a computer processor operatively coupled to the at least one sensor, the computer processor implementing at least one neural network comprising plural inputs and at least one output, wherein the inputs comprise at least one or more of the following: pressure altitude, air temperature, wind speed, weight, calibrated airspeed, autobrake setting, runway slope, and runway condition;
   the neural network being configured to calculate at least the remaining longitudinal distance on the runway in response to the plural inputs and to generate an alert when the calculated remaining longitudinal distance is insufficient;
   the neural network being further configured to predict, at landing initiation, the horizontal distance between the position where the aircraft will touch the runway and the position SP where the aircraft will stop;
   the computer processor being further configured to:
   (a) calculate (i) current landing distance available, (ii) the position SP, and (iii) the derivative of position SP,
   (b) detect whether calculated position SP will exceed the current landing distance available within a certain reaction time period, and
   (c) generate the alert if the computer processor detects that the position SP will exceed the current landing distance available within the certain reaction time period.

2. The system of claim 1 wherein the neural network is configured to calculate an air landing distance during a landing phase and a ground landing distance, during approach.

3. The system of claim 1 wherein the computer processor and/or the neural network are configured to obtain an air landing distance $S_{AIR}$ during a landing phase is by $$S_{AIR} = \frac{H_{ACFT}}{H_{REF}} \times S_{AIR,HREF}$$

where $H_{ACFT}$ is aircraft height above ground level, $H_{REF}$ is height above ground level where landing begins, and $S_{AIR,HREF}$ is determined by the neural network.

4. The system of claim 1 wherein the computer processor and/or the neural network are configured to obtain a ground landing distance during an air landing phase is by calculating $S_{GND}=S_{GND,HREF}$,
   where $S_{GND}$ is the ground landing distance,
   where $S_{GND,HREF}=S_{GND}$ is determined by the neural network at SH position where landing initiates.

5. A system for warning a flight crew of potential runway overruns during landing, comprising:
   a computer processor implementing at least one neural network comprising plural inputs and at least one output, wherein the inputs comprise at least one or more of the following: pressure altitude, air temperature, wind speed, weight, calibrated airspeed, autobrake setting, runway slope, and runway condition; and
   using the neural network to continually calculate at least the remaining distance on the runway and to generate an alert when the remaining distance is insufficient,
   wherein remaining ground distance during ground landing phase is obtained by $$S_{GND} = a \cdot GS^2 + \frac{(S_{GND,HREF} - a \cdot GS_{TD}^2)}{GS_{TD}} \cdot GS$$

where
$GS_{TD}$=ground speed at the touchdown moment,
$GS$=ground speed in the moment of calculation, and
$a$=curvature coefficient.

6. The system of claim 1 further including a further neural network for calculating remaining ground distance during ground landing phase.

7. The system of claim 1 wherein the processor calculates the touchdown position (TD) where the aircraft will touch the runway as $$TD=S_{ACFT}+S_{APP}+S_{AIR}-S_{RWY},$$

where $S_{ACFT}$, $S_{APP}$, $S_{AIR}$ and $S_{RWY}$ are longitudinal distances.

8. The system of claim 1 wherein the processor calculates the stop position (SP) where the aircraft will stop, as defined by:

$$SP=S_{ACFT}+S_{APP}+S_{AIR}+S_{GND}+S_{RWY},$$

where $S_{ACFT}$, $S_{APP}$, $S_{AIR}$, $S_{GND}$ and $S_{RWY}$ are longitudinal distances.

9. The system of claim 1 further including a control that allows the flight crew to shorten a landing distance available (LDA) length for an operator to increase a safety margin or to account for a threshold displacement and a LDA reduction.

10. The system of claim 1 wherein the neural network calculates, at the position where landing initiates, the horizontal distance between the position where landing initiates and the position where the aircraft will touch the runway.

11. The system of claim 10 wherein the neural network calculates, at the position where landing initiates, the horizontal distance between the position where the aircraft will touch the runway and the position where the aircraft will stop.

12. The system of claim 1 wherein the neural network calculates, at the position where landing initiates, the horizontal distance between the position where the aircraft will touch the runway and the position where the aircraft will stop.

13. A method for warning a flight crew of potential longitudinal runway overruns during landing, comprising:
   using at least one sensor to sense current position of an aircraft;
   implementing, using a computer processor operatively coupled to the at least one sensor, at least one neural network comprising plural inputs and at least one output, wherein the inputs comprise at least one or more of the following: pressure altitude, air temperature, wind speed, weight, calibrated airspeed, autobrake setting, runway slope, and runway condition;
   the neural network predicting, at landing initiation, the horizontal distance between the position where the aircraft will touch the runway and the position SP where the aircraft will stop;
   the processor calculating (i) current landing distance available, (ii) the position SP, and (iii) the derivative of position SP,
   the processor detecting whether calculated position SP will exceed the current landing distance available within a certain reaction time period and generating an alert if the processor detects that the position SP will exceed the current landing distance available within the certain reaction time period.

14. The method of claim 13 further including the neural network calculating:
an air landing distance during a landing phase, and
a ground landing distance during approach.

15. The method of claim 13 wherein calculating the air landing distance SAIR during the landing phase includes calculating:

$$S_{AIR} = \frac{H_{ACFT}}{H_{REF}} \times S_{AIR,HREF}$$

where HACFT is aircraft height above ground level, HREF is height above ground level where landing begins, and the method includes the neural network calculating SAIR,HREF.

16. The method of claim 13 wherein calculating the ground landing distance during the air landing phase includes calculating $$S_{GND} = S_{GND,HREF},$$

where SGND is the ground landing distance, and
wherein the method includes the neural network determining SGND,HREF=SGND at SH position where landing initiates.

17. The method of claim 13 further including using a further neural network to determine remaining ground distance during ground landing phase.

18. The method of claim 13 further including calculating a touchdown position (TD) where the aircraft will touch the runway as $$TD = S_{ACFT} + S_{APP} + S_{AIR} - S_{RWY},$$

where $S_{ACFT}$, $S_{APP}$, $S_{AIR}$ and $S_{RWY}$ are longitudinal distances.

19. The method of claim 13 further including the processor calculating the stop position (SP) where the aircraft will stop, as defined by:

$$SP = S_{ACFT} + S_{APP} + S_{AIR} + S_{GND} - S_{RWY},$$

where $S_{ACFT}$, $S_{APP}$, $S_{AIR}$, $S_{GND}$ and $S_{RWY}$ are longitudinal distances.

20. The method of claim 13 further including responding to a control that allows the flight crew to shorten a landing distance available (LDA) length for an operator to increase a safety margin or to account for a threshold displacement and a LDA reduction.

* * * * *